No. 857,559. PATENTED JUNE 18, 1907.
H. KERNGOOD.
SNAP FASTENER STUD.
APPLICATION FILED JULY 16, 1906.

Witnesses
D. W. Edelin.
E. W. Fincel.

Inventor
Herman Kerngood
by Wm. H. Fincel
Attorney

THE NORRIS PETERS CO., WASHINGTON, D. C.

UNITED STATES PATENT OFFICE.

HERMAN KERNGOOD, OF BALTIMORE, MARYLAND, ASSIGNOR TO ALMA MANUFACTURING COMPANY OF BALTIMORE CITY, OF BALTIMORE, MARYLAND, A CORPORATION OF MARYLAND.

SNAP-FASTENER STUD.

No. 857,559.  Specification of Letters Patent.  Patented June 18, 1907.

Application filed July 16, 1906. Serial No. 326,358.

*To all whom it may concern:*

Be it known that I, HERMAN KERNGOOD, a citizen of the United States, residing at Baltimore city, in the State of Maryland, have invented a certain new and useful Improvement in Snap-Fastener Studs, of which the following is a full, clear, and exact description.

The present invention is a development of the invention forming the subject of my patent dated October 2, 1906, No. 832,579, and in common with that invention relates to a spring stud for snap-fasteners which is so constructed as to resist or overcome the tendency of the spring element of the stud to be crushed, particularly in the operation of setting or fixing the stud upon a glove or other article.

The present snap-fastener stud has an outer spring element, an inner supporting eyelet, of which a number of varieties are shown, a binder for uniting the spring and eyelet, and a hollow rivet or closed-end eyelet which coöperates with the supporting eyelet to secure the stud to a glove or other article, the supporting eyelet and the fastening device (the hollow rivet or closed-end eyelet referred to) extending up into the spring toward its dome and the fastening device when set lying beneath and more or less close to or in intimate contact with the dome of the spring in such way as not to interfere with the resiliency of the spring, but, on the other hand, serving to support the spring against being crushed or otherwise deformed during the setting operation and in use.

Figure 1:
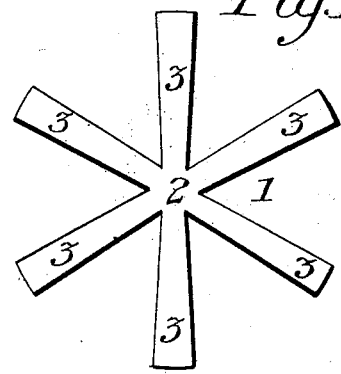
Figure 2:
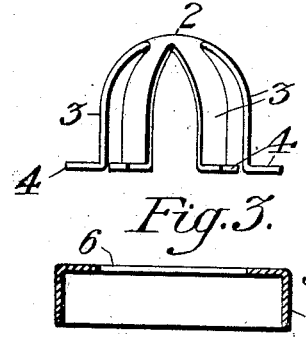
Figure 3:
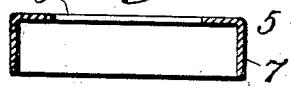
Figure 6:
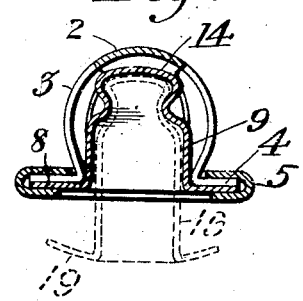
Figure 7:
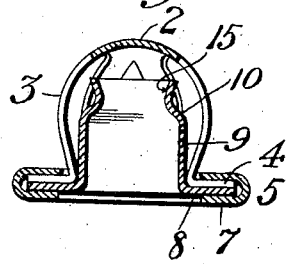
Figure 8:
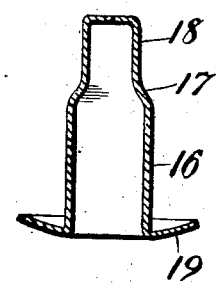
Figure 9:
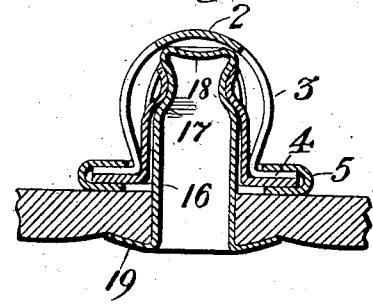
Figure 10:
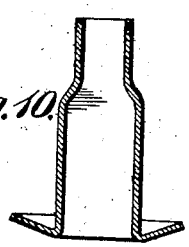

In the accompanying drawings, illustrating the invention, in the several figures of which like parts are similarly designated, Figure 1 is a plan view of the outer spring blank. Fig. 2 is an elevation of the blank of Fig. 1 drawn up to shape. Fig. 3 is a cross-section of the binder for uniting the spring and its inner eyelet. Figs. 4, 5, 6, and 7 are cross-sections of several studs showing different forms of inner eyelets, and also showing, in dotted lines, the fastening rivet or eyelet applied thereto in Figs. 4, 5 and 6. Fig. 8 is a longitudinal cross-section of a stepped fastening rivet or eyelet applicable to any of the studs of Figs. 4 to 7. Fig. 9 is a cross-section of the stud of Fig. 7 applied to an article. Fig. 10 is a section of a stepped eyelet or open-end rivet.

The spring may be made from a blank 1, having a central dome-piece 2 and a number of radiating legs 3, and this blank is bent into the form shown in Fig. 2, with the outer ends of its legs bent out laterally to form the feet 4, thus constituting the so-called "outer spring." A binder 5 is slipped down over these legs, and its opening 6 being of less diameter than the bent-up blank draws together the legs so as to make a bulb-shaped spring, as in Figs. 4 to 7 and 9, the individual legs having a slight play within the binder's opening. This binder bears upon the feet 4 of the spring. The inner eyelet Figs. 4, 5, 6 or 7, is then placed within the spring and the flange 7 of the binder is bent up beneath the flange of the inner eyelet and thus the spring and eyelet are united.

Figure 4:
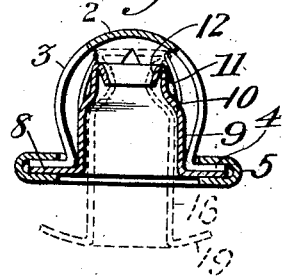
Figure 5:
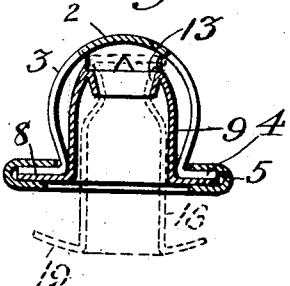

The inner eyelet may be of any of a number of forms, and all of the forms have in common a flange 8 and a barrel 9. In Fig. 4 it has a step 10 above which it has a part 11 of reduced diameter and an open top turned in at 12. In Fig. 5 there is no step, but its top is open and turned in at 13. This turning in of the open end of the inner eyelet as at 12 and 13, is useful in reinforcing such end to sustain the strains incident to clenching the fastening rivet. In Fig. 6 the top 14 is closed and bulb-shape. In Fig. 7 the eyelet is stepped as in Fig. 4, but its top 15 is flared outwardly. In all cases the inner eyelet has its barrel of approximately the inside diameter of the spring, to support the spring legs against undue compression, and its top extends up nearly to the dome of the spring.

The fastening rivet or eyelet 16 is stepped at 17, and has the reduced top 18 and base flange 19. It is inserted into the inner eyelet from the opposite side of the article to that on which the stud is arranged, and in the case of the open-end eyelets, its top is clenched in the open end and in close proximity to the dome of the spring, so as to coöperate with the eyelet in supporting the spring against being crushed or deformed in the act of setting and during use. In the case of the closed-end eyelet, Fig. 6, the fastening rivet or eyelet is upset or clenched within the bulbous top 14 as indicated by dotted lines.

The turning in of the open end of the inner eyelet, as already noted, reinforces said eyelet, and in addition it gives a wide mouth with a relatively narrow or contracted neck and thereby admits of the use of the stepped fastening rivet. This stepped rivet is valuable in that its reduced end is thinner and weaker than the body, due to the drawing of the metal in manufacturing, and consequently collapsing of the rivet at a definite point is insured. This collapsing occurs above the shoulder 17, while the remainder ordinarily remains rigid.

All of these various forms of inner eyelets and their attaching rivets or eyelets serve to support the outside spring and thereby preserve it from being crushed or otherwise deformed in setting or by rough usage, and also so support the spring that its elastic limit cannot be overcome. Furthermore, the stepped rivet affords at its part of greater diameter a lateral support for the stud to thereby prevent it from tilting and so working loose in practice. The reduced end of the rivet is relatively thinner than the remainder, due to drawing the metal in forming the rivet, and hence it tends to crush before the other and thus localizes the upsetting of the rivet in the upper end of the inner eyelet and preserves the integrity of the remaining portion for its supporting functions.

While I prefer to use a stepped fastening rivet or eyelet in all instances, it may be replaced by one not stepped in those forms of the stud shown in Figs. 6, 7, and 9. Furthermore, an open-end stepped eyelet, Fig. 10, may be used as the fastening.

By the term "rivet" as applied to the fastening device, I mean to include an eyelet as well.

What I claim is:—

1. A snap-fastener stud, having an outer spring composed of a dome and legs, an inner spring-supporting eyelet having a top smaller than its barrel and extending up into the spring close to its dome and whose barrel extends circumferentially to the legs of the spring, and means to unite the spring and inner eyelet, combined with a stepped rivet for attaching the stud to an article, said rivet extending up into the inner eyelet, substantially filling its bottom and having its top clenched at and to the smaller top of the inner eyelet.

2. A snap-fastener stud, having an outer spring, and an inner open-end spring-supporting eyelet whose top extends up beneath and in proximity to the dome of the spring and is turned in, and whose barrel extends circumferentially to the legs of the spring, combined with a fastening rivet for attaching the stud to an article, said rivet extending up into the inner eyelet and through the open top and its top clenched upon the turned-in top of said eyelet for effecting such attachment.

3. A snap-fastener stud, having an outer spring, provided with a dome, an inner stepped eyelet extending up toward the dome of the spring, means to unite the spring and eyelet, and an attaching rivet having a reduced upper end extending approximately to the dome of the spring, a shoulder next below, a portion below the shoulder of a diameter to substantially fill the inner eyelet, and a base flange.

4. A snap-fastener stud, having an outer spring composed of a dome and legs, and an inner open-end spring-supporting eyelet whose top extends up toward said dome and is turned in and whose barrel extends circumferentially to the legs of the spring, combined with a rivet for attaching the stud to an article, said rivet extending up into the inner eyelet, substantially filling its bottom and having a reduced top clenched at and to the top of the eyelet.

In testimony whereof I have hereunto set my hand this 11th day of July A. D. 1906.

HERMAN KERNGOOD.

Witnesses:
WM. H. H. RALEIGH,
MORTON KERNGOOD.